(12) United States Patent
Kyle et al.

(10) Patent No.: US 11,359,802 B2
(45) Date of Patent: Jun. 14, 2022

(54) ILLUMINATED GUIDE POLE FOR A WATERCRAFT-SUPPORTING STRUCTURE

(71) Applicants: Daniel Kyle, Fort Myers, FL (US); William Golden, North Fort Myers, FL (US)

(72) Inventors: Daniel Kyle, Fort Myers, FL (US); William Golden, North Fort Myers, FL (US)

( * ) Notice: Subject to any disclaimer, the term of this patent is extended or adjusted under 35 U.S.C. 154(b) by 0 days.

(21) Appl. No.: 16/919,848

(22) Filed: Jul. 2, 2020

(65) Prior Publication Data

US 2021/0003276 A1    Jan. 7, 2021

Related U.S. Application Data

(60) Provisional application No. 62/870,239, filed on Jul. 3, 2019.

(51) Int. Cl.
| | |
|---|---|
| *F21V 31/00* | (2006.01) |
| *F21V 8/00* | (2006.01) |
| *B63C 1/00* | (2006.01) |
| *F21V 15/015* | (2006.01) |
| *F21W 111/04* | (2006.01) |
| *F21Y 115/10* | (2016.01) |

(52) U.S. Cl.
CPC ............. *F21V 31/00* (2013.01); *B63C 1/00* (2013.01); *F21V 15/015* (2013.01); *G02B 6/0005* (2013.01); *F21W 2111/04* (2013.01); *F21Y 2115/10* (2016.08)

(58) Field of Classification Search
CPC . B60P 3/1075; B63C 3/06; B63C 1/00; F21V 15/015; F21W 2111/04; F21Y 2115/10; B60Q 1/305
See application file for complete search history.

(56) References Cited

U.S. PATENT DOCUMENTS

| | | | | |
|---|---|---|---|---|
| 4,787,327 | A * | 11/1988 | Porter ...................... | B63C 3/06 |
| | | | | 114/44 |
| D351,115 | S * | 10/1994 | Valdez ..................... | D10/114.6 |
| 6,203,181 | B1 * | 3/2001 | Gross ....................... | G09F 7/18 |
| | | | | 362/486 |
| 7,444,952 | B1 * | 11/2008 | McGann ................. | B63B 59/06 |
| | | | | 114/222 |
| 7,628,519 | B2 * | 12/2009 | Purdy .................... | B60Q 1/305 |
| | | | | 280/414.1 |
| 10,518,852 | B2 * | 12/2019 | Golden .................... | B63C 3/02 |
| 10,520,083 | B2 * | 12/2019 | Golden ................... | F15B 15/14 |
| 2005/0263982 | A1 * | 12/2005 | Mickley ................ | B60P 3/1075 |
| | | | | 280/414.1 |
| 2006/0120093 | A1 * | 6/2006 | Purdy .................... | B60Q 1/305 |
| | | | | 362/543 |
| 2009/0066058 | A1 * | 3/2009 | Comried, Jr. ......... | B60P 3/1075 |
| | | | | 280/414.1 |
| 2016/0090028 | A1 * | 3/2016 | Krejci ................. | B60Q 1/2657 |
| | | | | 362/485 |

(Continued)

*Primary Examiner* — Carib A Oquendo
(74) *Attorney, Agent, or Firm* — William E. Noonan

(57) ABSTRACT

An illuminated guide pole for a watercraft-supporting structure includes an elongate LED light source enclosed within a waterproof housing mounted to the supporting structure. The housing includes a transparent pipe for surrounding the LED light source. The light source is electrically connected to a source of power and may include an LED whip light device.

16 Claims, 3 Drawing Sheets

(56) References Cited

U.S. PATENT DOCUMENTS

| | | | |
|---|---|---|---|
| 2016/0243978 A1* | 8/2016 | Speropoulos | B60Q 1/0035 |
| 2017/0072841 A1* | 3/2017 | Schabacker | B60Q 3/64 |
| 2018/0222377 A1* | 8/2018 | Bradshaw | B60Q 1/0483 |
| 2019/0217770 A1* | 7/2019 | Washington | B60Q 1/0483 |
| 2019/0353338 A1* | 11/2019 | Vansickel | F21V 23/008 |
| 2021/0031668 A1* | 2/2021 | French | B60P 3/1066 |

* cited by examiner

ILLUMINATED GUIDE POLE FOR A WATERCRAFT-SUPPORTING STRUCTURE

RELATED APPLICATION

This application claims the benefit of US Provisional Application Ser. No. 62/870,239 filed Jul. 3, 2019.

FIELD OF THE INVENTION

This invention relates to an LED illuminated guide pole for use in boat lifts, hoists, trailers and other watercraft-supporting structures.

BACKGROUND OF THE INVENTION

Watercraft-supporting structures such as boat lifts, trailers and other platforms typically employ a plurality of vertical guide posts or poles that help to direct and center the boat or other vessel onto the support structure. Conventional guide poles can be difficult to see clearly at night, during storms and inclement weather, and other times when visibility is limited. Most watercraft guide poles also tend to exhibit a drab, non-descript and often unattractive appearance.

SUMMARY OF THE INVENTION

It is therefore an object of the present invention to provide an LED illuminated guide pole for effectively lighting watercraft supporting structures such as boat lifts, hoists, dry docks and trailers such that boats and other watercraft may be more effectively centered and properly positioned on the support structure, especially when visibility is restricted or reduced.

It is a further object of this invention to provide an illuminated guide pole that enables a watercraft operator to quickly and effectively identify and locate a targeted boat lift or other support structure, even from a considerable distance, at night and/or when visibility is otherwise limited.

It is a further object of this invention to provide an improved illuminated guide pole for boat-supporting structures that is extremely durable and able to both effectively withstand and operate well in harsh weather and marine conditions.

It is a further object of this invention to provide an LED illuminated guide pole that is aesthetically attractive and that can employ various color and lighting schemes for distinctively identifying the watercraft owner's support structure and watercraft berth.

It is a further object of this invention to provide an illuminated watercraft guide pole that is environmentally friendly.

It is a further object of this invention to provide an illuminated watercraft guide pole that clearly and unmistakably distinguishes an owner's boat lift or other vessel-supporting structure from surrounding and nearby supportive structures.

This invention features an illuminated guide pole for a watercraft support structure. The pole includes an elongate LED light source that is secured to and extends upwardly from the watercraft-support structure. The LED light source is enclosed within a waterproof housing, which includes a transparent longitudinal side wall or pipe that surrounds the LED light source. The LED light source is operably interconnected to a power supply for emitting light that is projected through the transparent longitudinal side wall of the housing to illuminate the boat-supporting structure.

In a preferred embodiment, the LED light source may include an elongate LED whip light device that is mounted to and extends upwardly from the watercraft-support structure. The housing may include an end cap that is secured to the longitudinal side wall at a distal upper end of the pole. The LED light source may be interconnected to a 12-volt battery or alternative power supply. When the watercraft-supporting structure is a boat lift, the power supply that operates the illuminated pole may be the same power supply that operates the boat lift.

BRIEF DESCRIPTION OF THE DRAWINGS

Other objects, features and advantages will occur from the following description of a preferred embodiment and the accompanying drawings, in which.

DETAILED DESCRIPTION OF PREFERRED EMBODIMENTS

Figure 1:
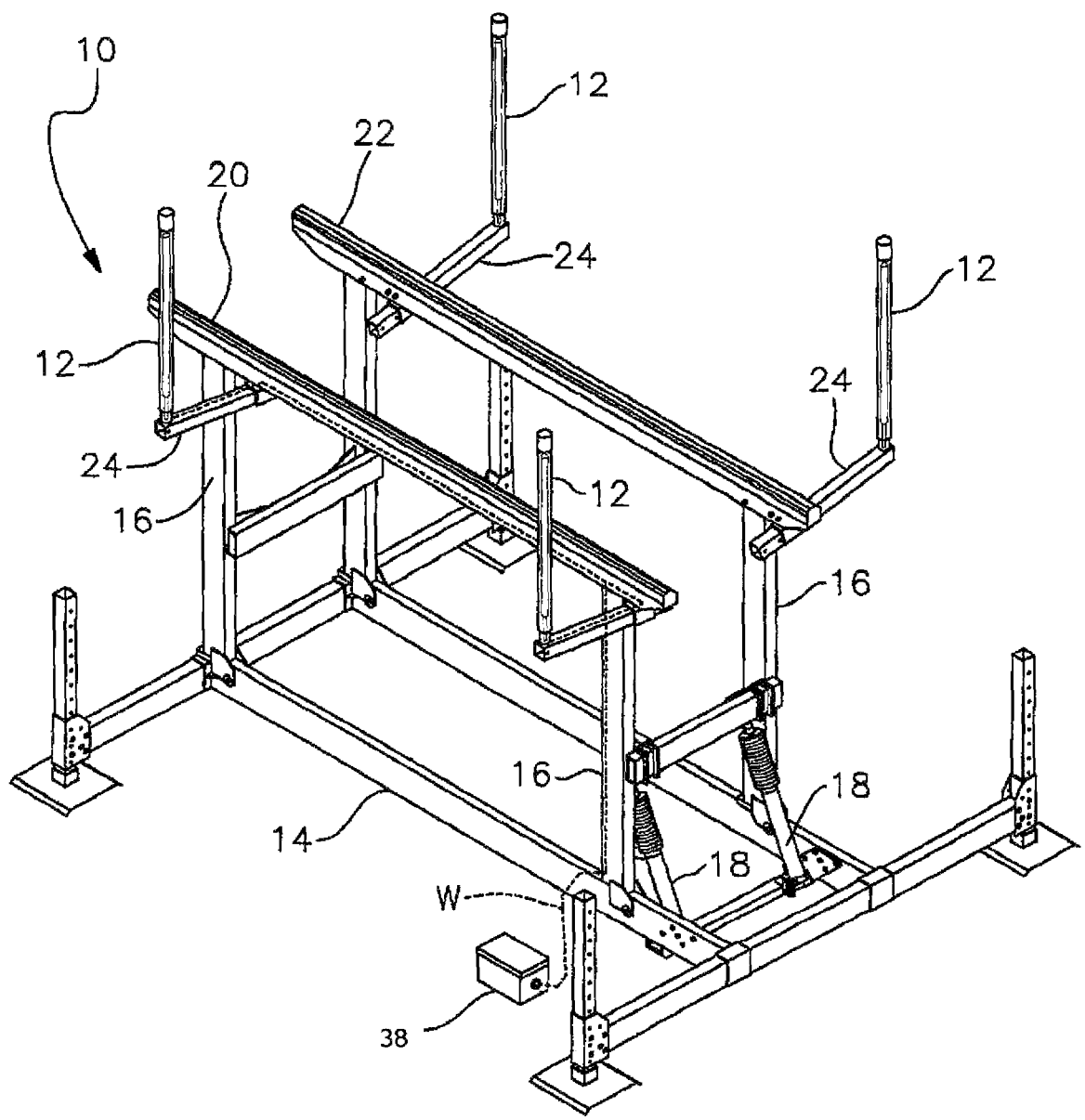
FIG. 1 is an upper perspective view of a boat lift employing four LED illuminated guide poles in accordance with this invention.

There is shown in FIG. 1 a watercraft-support structure 10 comprising a boat lift, which employs four LED illuminated guide poles 12 in accordance with this invention. It should be understood that one or more guide poles 12 may also be employed in other types of watercraft-supporting structures, which should be understood to comprise various types of boat hoists, boat trailers, dry docks, floating docks and waterside docks, storage platforms, piers, pilings and other structures employed to carry, hold or otherwise temporarily support or retain a vessel not in use. In any event, it should be, understood that the LED illuminated guide pole 12 is especially effective for use in guiding and centering a boat or other vessel with regard to a supportive boat lift as illustrated herein.

Boat lift 10 includes a framework 14 of the type disclosed in co-pending application Ser. No. 16/031,420 (now U.S. Pat. No. 10,520,083) and Ser. No. 16/194,675 (now U.S. Pat. No. 10,518,852). Specifically, framework 14 supports four pivotably retractable posts 16 that are selectively raised and lowered by actuator cylinders 18 in a manner described in the above-referenced applications. One pair of posts 16 support a first longitudinal cradle beam 20 and the other pair of posts 16 support a second longitudinal cradle beam 22 that is arranged generally parallel to beam 20. As will be understood to persons skilled in the art, posts 16 are selectively lowered to position, cradle beams 20 and 22 at a height required for guiding a boat or other watercraft onto the cradle beams. The lift is then raised to elevate and support the vessel above the waterline. Each of cradle beams 20 and 22 carries a pair of transverse beams 24 proximate respective ends of the cradle beam. Each transverse beam 24 extends laterally outwardly from the respective cradle beam to which it is mounted. Each transverse beam 24, in turn, supports a respective LED illuminated guide pole 12, which extends upwardly from the transverse beam proximate a distal end of the beam.

Figure 2:
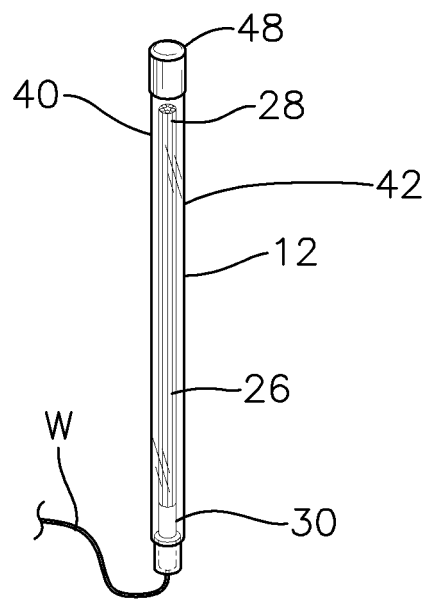
FIG. 2 is a perspective view of a representative LED illuminated guide pole.
Figure 3:
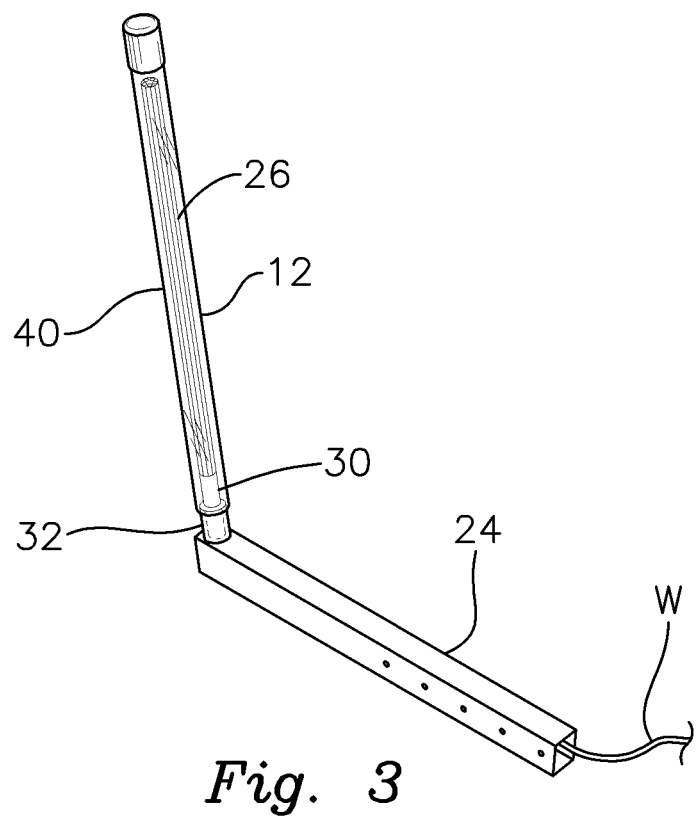
FIG. 3 is an upper perspective view of the illuminated guide pole mounted to a structural transverse beam of the boat lift of FIG. 1.

A representative guide pole 12 is shown in FIG. 2 and that guide pole is shown secured to the distal end of a respective transverse beam 24 in the manner shown in FIG. 3. More particularly, each LED illuminated guide pole 12 includes an elongate LED light source 26. The LED light source of the present invention preferably comprises an LED whip light device 28 of the type conventionally used in various other applications. LED whip light device 28 typically includes a bundle of LED optical fibers 29 that are operably joined to a fiberoptic base 30. Fibers 29 are assembled, bound together and/or arranged in a known manner for achieving desired visual effects. The LED whip light device may display assorted colors and visual features, and also may be electronically programmed and controlled (remotely or otherwise) to produce different color/lighting combinations, patterns, sequences, intensities and other lighting effects. The LED whip lights are commonly available in lengths of five or 10 feet, although alternative lengths may be utilized for the illuminated pole. Although LED whip lights are especially preferred, alternative LED light sources may be employed within the scope of this invention.

Figure 4:
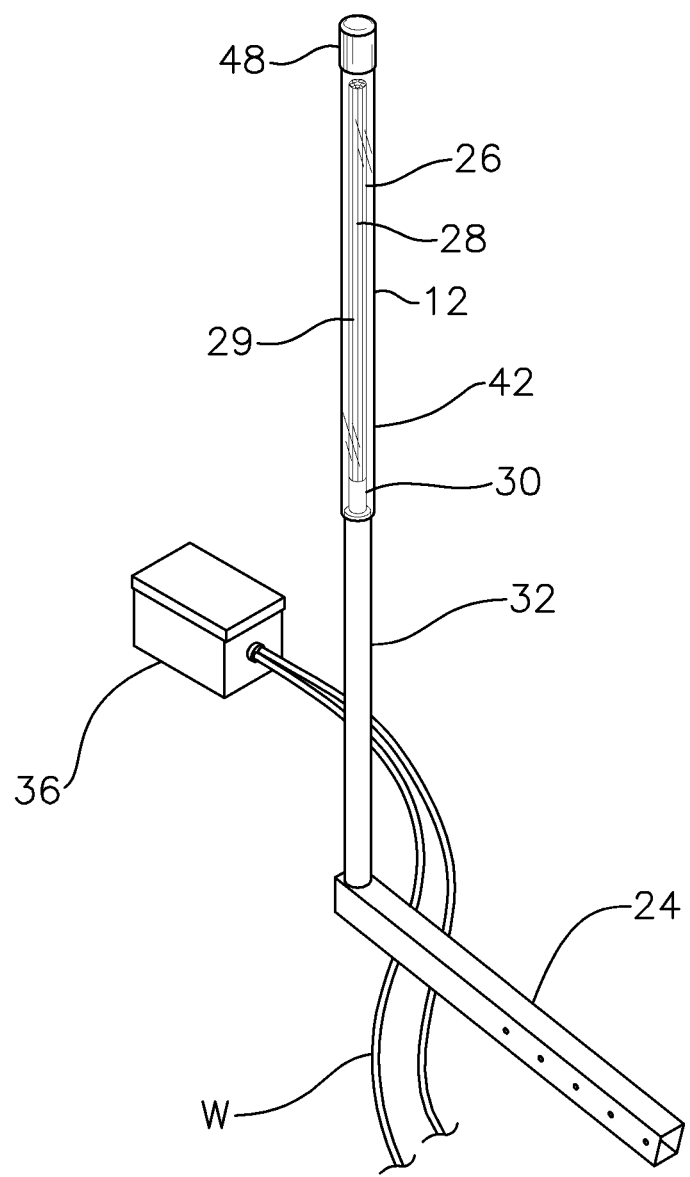
FIG. 4 is an alternative perspective view of the guide pole mounted to the boat lift and operably attached to a control box, which contains a battery for powering the illuminated guide pole.

LED base 30 is mounted within a cylindrical, nonilluminated pole stub 32, FIG. 3. Pole stub 32, which may have various selected lengths, as shown in FIGS. 3 and 4, is, in turn, fastened to a distal end of respective transverse beam 24 by assorted types of fasteners, such as those employed to mount conventional nonilluminated guide poles to a boat lift. As shown in FIGS. 3 and 4, electrical wiring W is operably interconnected to base 30 of LED light source 28. Wiring W is run through transverse beam 24 and, as shown in FIGS. 1 and 4, interconnected to a control box 36. In addition to other components for powering, operating and controlling lift 10, control box 36 accommodates a 12-volt battery, which supplies electrical power through wiring W to operate LED light source 26. The battery may also be employed to employ power to the winch motors or other components of the lift. Appropriate electronic controls (e.g., a microprocessor) may also be mounted within the control box 36 or elsewhere and operated remotely or otherwise to illuminate fiberoptic light source 28, as desired. Alternative power sources may be used within the scope of this invention.

Illuminated guide 12 further includes a waterproof housing 40 that encloses LED light source 26. Housing 40 features a transparent region comprising, a longitudinal tubular side wall or pipe 42 composed of a clear or transparent and UV resistant material such as PVC or polycarbonate. Typically, the tube has an outer diameter of approximately 2¼" although other dimensions may be employed within the scope of this invention. The upper distal end of pipe 42 is covered and sealably closed by a PVC cap 48 or alternative type of closure. The lower proximal end of pipe 42 is secured to pole stub 32 by an appropriate adhesive or other type of fastener. All components of the housing, including the end cap 48 and tubular pipe 42, should be constructed and composed such that they are able, to withstand adverse weather conditions and a harsh marine environment. The entire housing should be waterproof to prevent or at least reduce malfunctioning of the light source.

In operation, the illuminated guide poles 12 are lit by providing power from the battery inside control box 36 to LED light source 26. Light source 26 is illuminated to project light though transparent pipe 42. As a result, the guide poles 12 are brightly and distinctively illuminated to mark the location and outline of the boat lift. This more accurately guides the boat operator to center the vessel on the cradle beams of the lift platform so that it is properly supported thereon when the lift is raised. The LED illuminated guide poles provide for very convenient and accurate guidance for the boat operator, especially at night, during storms and at other times when visibility is impaired. The improved lighting provided by the poles permits the vessel to successfully enter and exit the lift or other support structure in a quicker and much safer manner.

The components of the illuminated guide pole are free of hazardous chemicals and are friendly to the environment, as well as surrounding wildlife. Not only do the guide poles achieve significantly improved vessel guidance, they also present an aesthetically attractive and very distinctive appearance. The illuminated guide poles allow the owner's lift or other support structure to be immediately and prominently distinguished from surrounding or nearby berths and support structures. Even from a great distance, the operator of a vessel is able to more easily locate and navigate toward his or her respective berth.

Accordingly, the present invention relates to an LED illuminated guide pole for boat lifts and other watercraft supporting structures. Although specific features of the invention are shown in some of the drawings and not others, this is for convenience only, as each feature may be combined with any and all of the other features in accordance with this invention.

What is claimed is:

1. An illuminated boat lift assembly comprising:
a boat lift including a generally parallel pair of elongate cradle beams for supporting a boat, a lift power supply, and a lift mechanism operated by said lift power supply for selectively raising and lowering said cradle beams; and
an elongate illuminated guide pole carried by said boat lift, said guide pole including an LED light source secured to and extending vertically upwardly from a respective said cradle beam, said guide pole further including a substantially waterproof housing that sealably encloses said LED light source and has a transparent region, said LED light source including a bundle of LED optical fibers that are operably connected to a fiberoptic base at a lower end of said LED light source, a light source power supply being operably interconnected to said LED optical fibers through said fiberoptic base at said lower end of said LED light source and selectively activated for energizing said LED light source to emit light, which is projected through said transparent region of said housing to illuminate said boat lift.

2. The apparatus of claim 1 in which said housing includes an elongate transparent tube that receives and surrounds said LED light source.

3. The apparatus of claim 2 in which said transparent tube is attached to a pole stub at a proximal lower end of said tube, said fiberoptic base being mounted to said pole stub, and said pole stub being interconnected to said respective cradle beam to support said light source thereon.

4. The assembly of claim 3 in which said pole stub is interconnected to said watercraft support structure by a transverse beam, which extends laterally and generally horizontally outwardly from said respective cradle beam for supporting said LED light source to extend vertically upwardly therefrom.

5. The assembly of claim 1 in which said lift power supply and said LED light source power supply are defined by a single common power supply.

6. The assembly of claim 5 in which said single common power supply includes a battery mounted within a control box, which control box further includes electronic controls for selectively operating said lift mechanism and said fiberoptic light source.

7. The assembly of claim 1 in which said illuminated pole guide is interconnected to said respective cradle beam by a transverse beam that extends generally horizontally and outwardly from said respective cradle beam and which supports said LED light source to extend vertically upwardly therefrom, said transverse beam and said respective carrier beam including respective longitudinal channels that accommodate wiring to electrically interconnect said light source power supply and said fiberoptic base.

8. The apparatus of claim 1 in which said light source includes a bundle of LED optical fibers that are operably interconnected to a fiberoptic base, which base is supported at a lower end of said illuminated guide pole.

9. An illuminated boat lift assembly comprising:
a lift mechanism including a supportive framework;
four elongate support posts pivotally connected to said supportive framework proximate lower ends of said support posts;
means for pivoting said support posts selectively between a raised condition and a lowered condition relative to said supportive framework;
an elongate first cradle beam attached pivotally to and carried by a first pair of said posts and a second cradle beam pivotally attached to and carried by a second pair of said support posts proximate upper ends of said posts, said cradle beams for supporting a boat thereon;
each said cradle beam carrying at least one transverse beam that extends laterally outwardly from said cradle beam; each said transverse beam supporting a respective LED illuminated guide pole, each said LED illuminated guide pole including an elongate LED light source secured to and extending upwardly from said transverse beam and sealably enclosed by a substantially waterproof housing that has a transparent region;
an electrical power supply operably connected to each said elongate light source proximate a lower end of said light source for selectively energizing said LED light source to emit light, which light is projected through said transparent region of said housing to illuminate said boat lift assembly.

10. The apparatus of claim 9 in which said LED light source includes an elongate LED whip light device mounted to and extending from a respective said transverse beam.

11. The apparatus of claim 9 in which said housing includes an elongate transparent tube that receives and surrounds said LED light source.

12. The apparatus of claim 11 in which said housing includes an end cap sealably secured to and covering an open distal upper end of said transparent tube.

13. The apparatus of claim 11 in which said light source includes a bundle of LED optical fibers that are operably interconnected to a fiberoptic base, which base is supported at a lower end of said illuminated guide pole.

14. The apparatus of claim 13 in which said transparent tube is attached to a pole stub at a lower proximal end of said tube and below said elongate LED light source, said fiberoptic base being mounted to said pole stub, which pole stub is supported by a respective transverse beam, which transverse beam interconnects said light source to a respective said cradle beam.

15. The apparatus of claim 9 in which said posts, said cradle beams and said transverse beams include longitudinal channels that accommodate electrical wiring for interconnecting said power supply to said LED light sources.

16. An illuminated boat lift assembly comprising:
a lift mechanism including a supportive framework;
four elongate support posts pivotally connected to said supportive framework proximate lower ends of said support posts;
means for pivoting said support posts selectively between a raised condition and a lowered condition relative to said supportive framework;
an elongate first cradle beam attached pivotally to and carried by a first pair of said posts and a second cradle beam attached pivotally to and carried by a second pair of said support posts proximate upper ends of said posts, said cradle beams for supporting a boat thereon;
each cradle beam carrying at least one transverse beam that extends laterally outwardly from said cradle beam; each said transverse beam supporting a respective LED illuminated guide pole, each said LED illuminated guide pole including an elongate LED light source secured to and extending upwardly from said transverse beam and sealably enclosed by a substantially waterproof housing that has a transparent region, each said LED light source including a bundle of LED optical fibers operably connected to a fiberoptic base at said lower end of said LED light structure; and
an electrical power supply operably interconnected to each said elongate light source by a respective said fiberoptic base of said light source for selectively energizing said LED light source to emit light, which light is projected through said transparent region of said housing to illuminate said boat lift assembly.

* * * * *